Feb. 6, 1934.  A. W. MILLER  1,946,291
AIR CLEANER
Filed Sept. 24, 1931   2 Sheets-Sheet 2

INVENTOR
Arthur W. Miller
BY
ATTORNEY

Patented Feb. 6, 1934

1,946,291

UNITED STATES PATENT OFFICE 1,946,291

AIR CLEANER

Arthur W. Miller, Milwaukee, Wis.

Application September 24, 1931
Serial No. 564,782

16 Claims. (Cl. 183—10)

This invention relates to air cleaners of the type wherein a liquid, usually oil, is employed as a cleansing medium. Such cleaners are commonly used in connection with internal combustion engines, compressors and the like for the purpose of ridding the incoming air of dust, dirt and other impurities.

Present commercial forms of air cleaners of the type mentioned ordinarily include a filtering medium, comprising a loose mass of non-absorbent material, such as steel wool, crinkled wire, or the like, through which the air is drawn, and into which oil is admitted for the purpose of absorbing and carrying off impurities from the air passing therethrough and for the additional purpose of keeping the filter clean. Such cleaners also ordinarily include an oil reservoir from which the oil is supplied to the filter and to which the dirt laden oil is returned from the filter.

In prior cleaners of the type mentioned, the oil is usually transmitted directly from the reservoir to the filter by the action of the incoming air, so that the amount of oil supplied to the filter varies with the rate of air flow. Such cleaners have not proven entirely satisfactory however due to an inability to maintain a proper supply or a proper circulation of oil to and through the filter, under the various conditions of operation to which they are subjected in normal use. For instance, when applied to an internal combustion engine, the rate of flow of incoming air varies greatly with engine speed and load. During idling or at slow speeds under light or moderate load the rate of air flow is but a small fraction of the rate at high speed or at full load operation, and the amount of oil supplied to the filter varies accordingly. Consequently, during idling, the amount of oil supplied to the filter is insufficient to effectually clean the air or to keep the filter clear of obstructing matter deposited from the air; and at high speed or full load operation the supply of oil is excessive and is carried off by the air, thereby depleting the supply of oil and impairing the cleaning function.

A general aim of the present invention is the provision of an improved air cleaner of the character mentioned which shall be free of the above objections.

One object is the provision in an air cleaner of means for supplying to the filter a proper supply of oil regardless of the rate of flow of air therethrough.

Another object is the provision in an air cleaner of improved means for effecting continuous removal of dirt laden oil from the filter.

Another object is the provision in an air cleaner of a novel combination of parts so arranged as to maintain a substantially continuous circulation of oil through the filter in an improved manner and in such quantities as to effectually clean the air and to remove from the filter impurities received from the air.

Other more specific objects and advantages will appear from the following description of an illustrative embodiment of the present invention.

In the accompanying drawings:—

Figure 1:
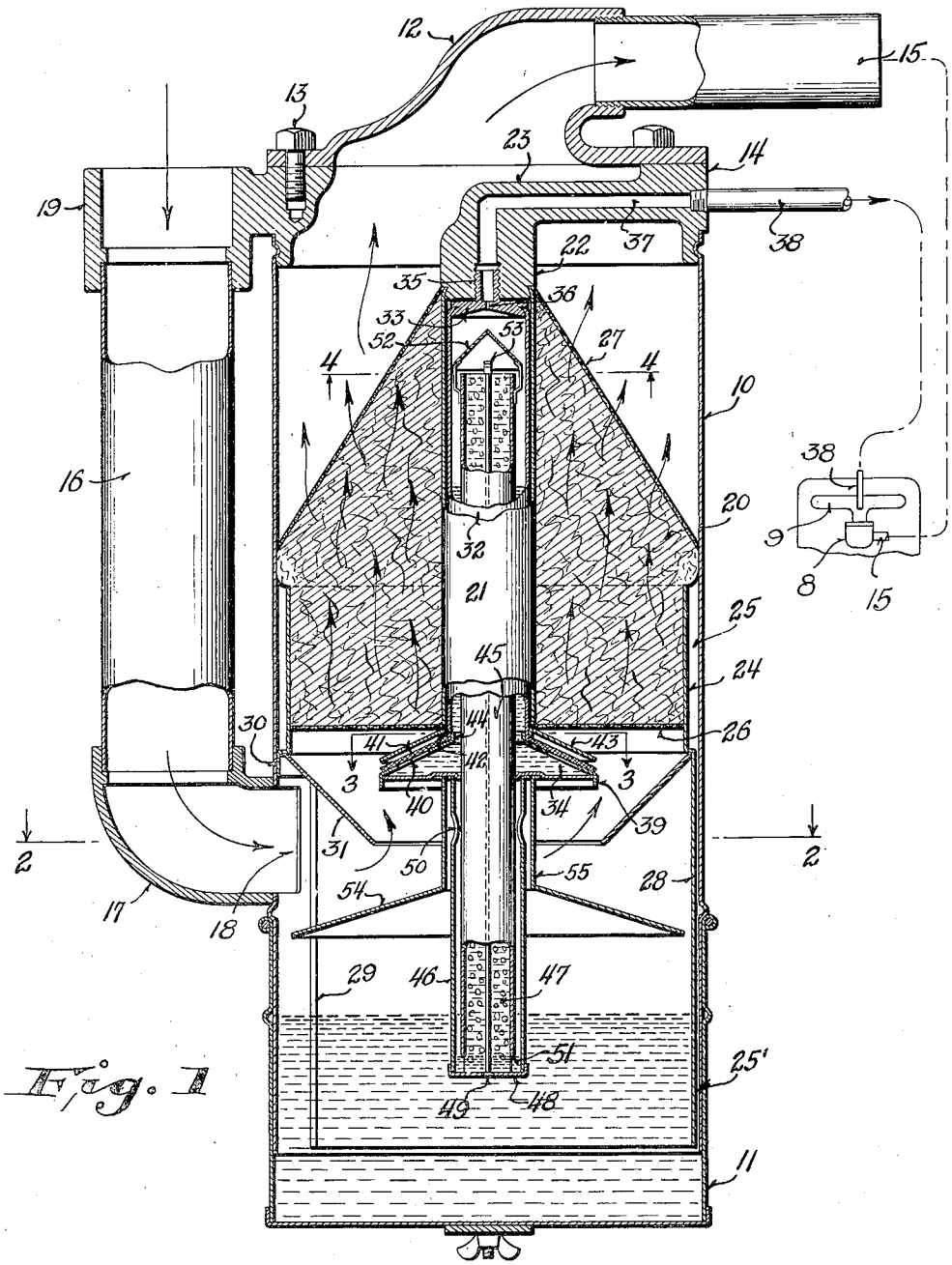
Fig. 1 is a vertical sectional view of an air cleaner constructed in accordance with the present invention.

The air cleaner selected for illustration comprises a cylindrical housing or shell 10, preferably of sheet metal, closed at the lower end by a cup-shaped container 11 removably applied thereto. The container 11 provides an oil reservoir which is ordinarily filled to about the level indicated in Fig. 1. The upper end of the shell is closed by a hollow outlet fitting 12, preferably removably attached by bolts 13, or otherwise, to a ring 14 fixed to the shell.

A discharge conduit 15, connected to the fitting, leads to the intake of an engine carburetor 8. Air is admitted to the lower end of the shell preferably through a conduit 16 which communicates with the shell through a fitting 17 and side opening 18, and which is confined between the fitting 17 and a fitting 19 preferably formed integral with the ring 14.

A filtering medium 20, preferably comprising a loose mass of non-absorbent material, such as steel wool, crinkled wire or the like, extends across the shell 10 above the air inlet opening 18 and below the outlet fitting 12. In this instance the filtering material surrounds a central tube 21 depending from and supported by the down-turned end 22 of a goose-neck 23, preferably formed integral with the ring 14. The lower portion of the filtering material is surrounded by a cylindrical shell 24 spaced inwardly from the main shell 10 to form a drain passage 25 for a purpose to be later described, the material being further confined between a substantially flat bottom screen 26 and a top screen 27 preferably of conical form and sloping downwardly and outwardly over the drain passage 25. It will, of course, be understood that atmospheric air entering the conduit 16 and opening 18 is drawn upwardly through the filter 20 by the suction transmitted from the engine through the conduit 15.

Figure 2:
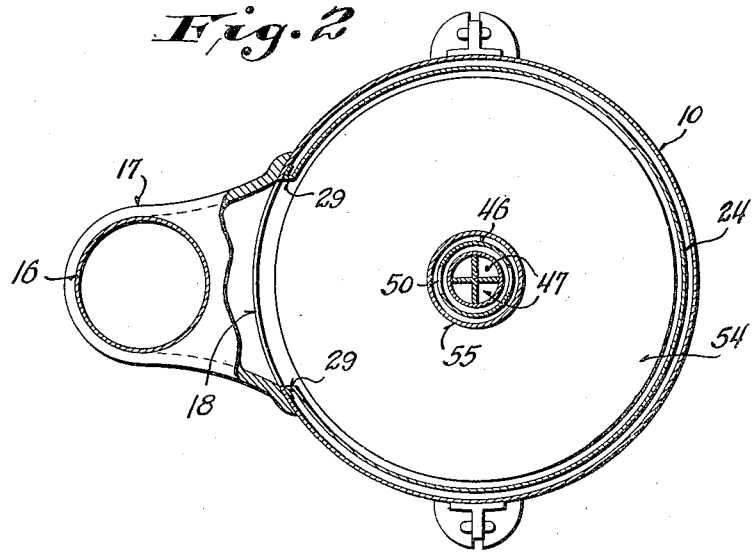
Fig. 2 is a horizontal sectional view on the line 2—2 of Fig. 1.
Figure 3:
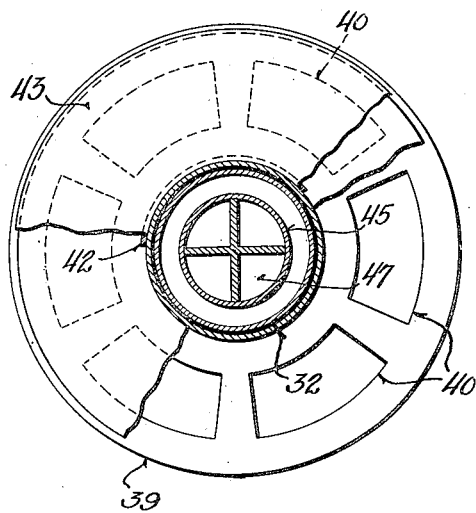
Fig. 3 is a sectional view, on a larger scale, taken along the line 3—3 of Fig. 1.
Figure 4:
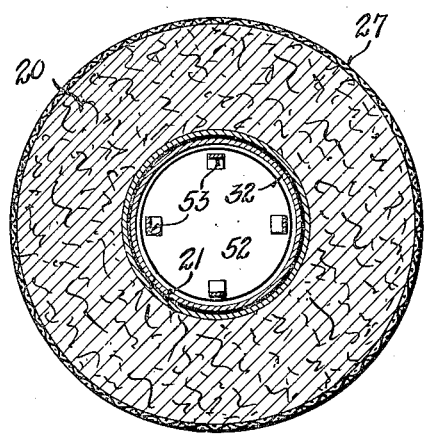
Fig. 4 is a sectional view on the line 4—4 of Fig. 1.

The inner shell 24 is provided with a depending apron 28 of substantially cylindrical form which extends downwardly into the body of oil in the reservoir and which is spaced slightly from the main shell 10 to provide a continuation 25′ of the drain passage 25. As indicated in Figs. 1 and 2, that portion of the apron 28 adjacent the inlet opening 18 is cut away and the edges 29 thereof are bent outwardly against the shell 10 and secured thereto by soldering or otherwise. That portion of the inner shell 24 above the opening 18 is flanged, as indicated at 30 in Fig. 1, and also secured to the shell 10.

The edges 29 and flange 30 are preferably tightly joined to the shell 10 in such manner as to prevent the admission of air to the passages 25 and 25′, the lower end of passage 25′ being sealed by the oil in the reservoir. Due to the fact that the upper end of passage 25 is exposed to the suction in the upper end of the shell 10, oil rises from the reservoir into the passage 25′, and to reduce to a minimum the amount of oil thus withdrawn from the reservoir the passage 25′ is very narrow.

A circular ring or baffle 31, preferably of dished form, mounted within the apron 28 above the inlet opening 18, serves to distribute the incoming air throughout the bottom of the filter 20, and also to increase the velocity of flow at that point.

Provision is made in the filter shown for effecting a substantially continuous discharge of oil into the air stream, as it issues through the central opening in the baffle 31, so that the oil thus discharged is carried upwardly by the air into the filter. Although this might be accomplished in various ways, the novel form of pneumatic oil elevator which will now be described has proven entirely satisfactory for the purpose.

The oil elevator shown comprises a tube 32, sealed at its upper end by a plug 33 fixed therein and connected at its lower end to a valve chamber 34. The tube 32 is disposed within the tube 21 and is supported by a threaded shank 35 on the plug 33, which is screwed into the end 22 of the goose-neck 23. The tube 32 and connected parts may thus be readily removed for inspection, replacement, or repair by rotating the tube and shank 35 in such direction as to unscrew the same. The tube 32 communicates, through a restricted passage 36 in the plug 33, with a passage 37 in the goose-neck, which passage in turn communicates, through a tube 38, with the intake manifold 9 of the engine at a point beyond the engine carburetor. During operation a partial vacuum is thus maintained in the tube 32 by suction transmitted through the restricted passage 36 from the intake manifold, regardless of whether the engine carburetor is open or closed.

The valve chamber shown at 34 is disposed below the filter 20 and is in the form of a hollow disk, having a depending peripheral lip 39, and also having a plurality of outlet ports 40 in the top face thereof. The ports 40 are covered and normally closed by a circular flap valve 41 of flexible material, such as leather, which functions to prevent admission of air to the valve chamber, but to permit the escape of oil therefrom. In this instance the valve is releasably retained in place by the down-turned inner flange 42 of an overlying protector ring 43. The valve chamber 34 is fixed to the lower end of the tube 32 by appropriate means such as an upturned flange 44 which is fixed to the interior of the tube.

The tube 32 and valve chamber 34 constitute an auxiliary reservoir into which oil is introduced through an oil elevating tube 45 and from which oil is discharged beneath the flap valve 41. The oil elevating tube 45 is supported by the bottom of the valve chamber 34. It extends upwardly nearly to the top of the tube 32 and downwardly into a narrow well 46 to a point below the oil level in the reservoir. The interior of the tube 45 is preferably divided by suitable partitions into a plurality of narrow channels 47.

The well 46 in this instance comprises a tube, only a little larger than tube 45, supported by and depending from the bottom of the valve chamber 34, the lower end of the tube being closed by a cap 48 having a narrow port 49 through which oil is slowly admitted thereto. The upper end of the well is open to the air in the housing through suitable side ports 50.

As a result of the partial vacuum or suction maintained in the tube 32 by manifold suction, oil passes upwardly through the elevating tube 45 from the well 46 and discharges substantially continuously into the tube 32, to thereby flood the valve chamber 34 and maintain a column of oil in the tube 32. The column of oil thus maintained is of sufficient height to overcome the sustaining effect of the partial vacuum in the tube 32, with the result that there is a substantially continuous escape of oil from the base of this column through the ports 40, the escaping oil seeping beneath the flap valve 41 and dripping from the lip 39 into the stream of air passing upwardly through the baffle 31.

It will be noted that the rate of oil admitted to the well 46 through the narrow port 49 is so restricted that withdrawals from the well through the elevating tube 45 reduces the amount of oil in the well causing the same to assume a low, minutely fluctuating level adjacent the lower end 51 of the elevating tube. As this level fluctuates below the end 51 of the tube, small quantities of air enter the tube from the well to thereby aerate the narrow columns of oil within the narrow tube channels 47 and thus facilitate the upward travel of the oil therethrough. By reason of this aerated condition of the oil in tube 45, the degree of vacuum in tube 32, required to elevate oil from the lower reservoir through the tube 45, is not so great as to prevent the discharge of oil from the tube 32 in the manner above described.

The air discharged from the uper end of the tube 45 escapes through the passages 36 and 37 and tube 38 to the engine manifold. An appropriate baffle 52, mounted over the upper end of tube 45 precludes the entry of oil from the tube 45 into the passage 36. In this instance the baffle 52 comprises a sheet metal cone supported on brackets 53, preferably fixed to the outside of and below the end of the tube 45, so that oil will drain from the baffle and brackets into the tube 32 rather than into the tube 45.

It will also be noted that the oil that drips substantially continuously from the lip 39 of the valve chamber 34 is immediately picked up and carried directly into the filter 20 by the upward flow of air through the baffle 31, so that the rate of oil transmitted to the filter is not governed by the rate of air flow but by the rate of discharge of oil from the valve chamber 34, except during occasional momentary periods of excessive discharge when some of the oil may pass through the air stream and fail to reach the filter. Except for momentary fluctuations which do not materially affect the functioning of the cleaner and which may therefore be disregarded, the rate of discharge of oil from the chamber 32 is automatically maintained substantially constant, or at least between narrow limits, as will appear from the following observations.

Since the oil elevating tube 45 receives its entire supply of oil from the well 46, the rate at which oil passes upwardly through tube 45 into tube 32 is limited by the rate at which oil is admitted to the well through the narrow port 49, that being governed primarily by the size of the port and, to some extent, by the depth of the port below the level of oil in the reservoir, although, if positioned two inches below the normal reservoir level, it has been found that a one inch rise in that level will not materially change the rate of flow through the port. Since the tube 32 always communicates with the high suction or partial vacuum in the engine intake manifold, the degree of vacuum maintained therein is sufficient, under all operating conditions, to maintain a maximum flow of oil upwardly through the tube 45. The tube 32 is therefore continuously supplied with oil at a substantially constant rate, as governed by the port 49.

The restricted passage 36 between the tube 32 and manifold suction prevents the creation of an excessive degree of vacuum within the tube 32, and thereby prevents a complete flooding of the tube 32 by the column of oil therein, which would otherwise occur if the degree of vacuum therein were permitted to approximate the degree of vacuum within the engine manifold. In this connection it will be noted that the air discharged into tube 32 from the tube 45 tends to reduce the vacuum in the tube 32, and that the size of passage 36 is so selected as to carry off this air at a rate sufficient to maintain the desired degree of vacuum therein. Although the degree of vacuum, thus maintained, varies somewhat with changes in manifold suction, such variations are very slight.

The height of the column of oil sustained within the tube 32 corresponds at all times to the difference between the internal air pressure or degree of vacuum within the tube and the external air pressure or degree of vacuum surrounding the valve 41. For any given engine load and speed that difference is constant, so that the height of the oil column remains constant, consequently the rate of discharge of oil from the valve chamber corresponds to the rate of oil delivered to the tube 32 from the tube 45. As above pointed out, this rate is governed by the port 49 in the well 46, so that for any given engine speed and load the rate of discharge from the chamber 34 is substantially constant.

Furthermore, although slight changes occur in the external air pressure or partial vacuum surrounding the valve 41 with changes in the rate of flow of air through the cleaner, as a result of changes in engine speed or load, and although similar slight changes also occur in the internal air pressure or partial vacuum within the tube 32, as a result of changes in engine speed or load, these changes are immediately compensated for by a change in the height of the oil column in the tube 32, causing a momentary change in the rate of oil discharge, but as soon as the oil column has readjusted itself to the changed conditions the height thereof again becomes constant and the oil discharge rate again equals the rate of oil supply to the tube 32. Therefore, the rate of oil supplied to the filter is governed by the port 49 in the well 46 and remains substantially constant under all conditions of operation, except for momentary fluctuations which occur at the instant of change in those conditions.

As hereinabove indicated, the fall or rise of the oil level in tube 32, as the oil column adjusts itself automatically to changes in operating conditions, is of course, accompanied by a momentary increase or decrease in the rate of discharge of oil from the valve chamber 34. For instance, if, due to changes in operating conditions, the suction within that area surrounding the valve 41 be suddenly increased or the suction within the tube 32 be suddenly decreased, or both, the oil column in tube 32 will immediately lower, causing an increased discharge of oil through the valve 41, and if such change is pronounced and occurs very abruptly the amount of oil discharged may, for an instant, be so great that some of it may pass through the air stream and fail to reach the filter; and, on the other hand, if the suction within that area surrounding the valve 41 be suddenly decreased or the suction within tube 32 be suddenly increased, or both, the discharge of oil from the valve 41 decreases and may momentarily cease until the height of the oil column in tube 32 has increased, to correspond to the new condition, by oil supplied through the tube 45. These fluctuations in the rate of discharge of oil from the valve 41, however, are only occasional and momentary departures from the normal discharge rate, which rate is substantially the same whether the engine be operating at high or low speed or under no-load or full-load condition.

The oil, substantially continuously supplied to the lower inlet end of the filter 20 in the manner above described, adheres rather tenaciously to the material of the filter, and, under the influence of the air flow through the filter, works its way upwardly toward the discharge end thereof, so that throughout the filter the material thereof is coated with oil to which impurities in the air adhere and by which these impurities are absorbed and retained. This upward progress of the oil through the filter continues, carrying the entrapped impurities with it, until the upper top screen 27 is reached. The dust laden oil clings to this screen and drains downwardly toward the base thereof where it accumulates and ultimately flows by gravity into the drain passage 25. From the drain passage 25 the dust laden oil is returned to the oil reservoir through the narrow passage 25'.

It will thus be noted that the sloping discharge end of the filter greatly facilitates the removal of the dust laden oil from the filter, and that the tapered or conical form thereof affords a relatively large drain area for the oil over which the oil may spread in such manner as to avoid interference with the air discharging therethrough.

The oil reservoir also functions as a trap or settling chamber for the impurities carried thereto by the returning oil, and in order to avoid disturbance of the body of oil therein by the blast of incoming air, a shield 54 is preferably provided below the air inlet opening 18. In this instance the shield 54 is supported by a tube 55 fixed to and depending from the bottom of the valve chamber 34. The tube 55 also protects the ports 50 and well 46 against the blast of the incoming air.

Although I have produced successful air cleaners embodying the present invention in which the parts were variously proportioned and arranged, I shall cite, as an example, a particular air cleaner having the following specific proportions and which has been applied to and successfully operated in connection with a commercial form of gasoline engine having a displacement of 648 cubic inches at 2200 revolutions per minute.

In the particular cleaner mentioned the parts were proportioned and arranged substantially as shown in the accompanying drawings, the main housing or shell 10 having an inside diameter of $8\tfrac{1}{8}$ inches; the well 46 having an inside diameter of $1\tfrac{5}{16}$ inches, and being immersed to a depth of 1½ inches below the normal (with the engine at rest) oil level in the base of the housing; the port 49 in the bottom of the well being $\tfrac{5}{32}$ inch in diameter; the oil elevator tube 45 having an inside diameter of $\tfrac{11}{16}$ inches and extending upwardly to a height of approximately 12 inches from the bottom of the well; the tube 32 having an inside diameter of $2\tfrac{1}{16}$ inches, the length of this tube plus the depth of the valve chamber being substantially 11 inches, so that the oil discharged from said chamber at a point approximately 3½ inches above the normal oil level; and the restricted port 36 at the top of the tube having a diameter of .0635 inches.

Various changes may be made in the embodiment of the invention hereinabove described without departing from or sacrificing the advantages of the invention as defined in the appended claims.

I claim:

1. In an air cleaner for internal combustion engines of the type having a carburetor, said cleaner comprising the combination of a filter, means for directing air through said filter by carburetor suction, means for delivering a dust absorbing liquid to said filter, and suction means operated independently of carburetor suction for supplying liquid to said delivery means.

2. In an air cleaner for internal combustion engines of the type having a carburetor and intake manifold, said cleaner comprising means for directing air through said filter by carburetor suction, and means energized by manifold suction independently of said carburetor for delivering a dust absorbing liquid into a zone of admission to said filter.

3. In an air cleaner for the purposes described the combination of a filter through which air passes, a liquid reservoir, a well having a restricted liquid admission passage below the level of liquid in said reservoir through which said well is supplied with liquid, and fluid actuated means supplied from said well for delivering liquid to said filter.

4. In an air cleaner for the purposes described the combination of a filter through which air passes, a liquid reservoir, a well having a restricted liquid admission passage below the level of liquid in said reservoir through which said well is supplied with liquid from said reservoir, means including an auxiliary reservoir through which liquid is delivered to said filter, and means supplied from said well for supplying liquid to said auxiliary reservoir.

5. In an air cleaner the combination of a filter through which air passes, a liquid reservoir, a well having a restricted liquid admission passage below the level of liquid in said reservoir through which said well is supplied with liquid from said reservoir, means including a vacuum chamber through which liquid is delivered to said filter, and suction means supplied from said well for supplying liquid to said chamber.

6. In an air cleaner the combination of a filter through which air passes, a liquid reservoir, a well having a restricted liquid admission passage below the level of liquid in said reservoir through which liquid is supplied thereto from said reservoir and also having an air inlet, means including a vacuum chamber through which liquid is delivered to said filter, and means energized by the vacuum in said chamber for transferring a mixture of liquid and air from said well to said chamber.

7. In an air cleaner the combination of a filter through which air passes, a reservoir, means including a vacuum chamber through which liquid is delivered to said filter, means energized by the vacuum in said chamber and supplied from said reservoir for supplying a mixture of air and oil to said chamber, suction transmitting means connected with said chamber for maintaining a partial vacuum therein, and a restricted passage between said last named means and chamber for limiting the degree of vacuum thus maintained in said chamber.

8. In an air cleaner the combination of a filter through which air passes, a reservoir, a vacuum chamber, means energized by the vacuum in said chamber for transferring liquid from said reservoir to said chamber, and valve means through which liquid is delivered to said filter from said chamber, said valve means being effective to prevent admission of air therethrough to said chamber.

9. In an air cleaner the combination of an upright filter, means for directing air upwardly through said filter, and means having an outlet beneath said filter for discharging a dust absorbing liquid into the air stream in advance of said filter to effect transfer and distribution of said liquid by the air into said filter, and means encircling said filter for receiving and carrying away liquid discharged from said filter.

10. In an air cleaner the combination of an upright filter, means for directing air upwardly through said filter, and means having an outlet disposed concentrically of and beneath said filter for discharging a dust absorbing liquid into the air stream in advance of said filter to effect transfer and distribution of said liquid by the air into said filter, and means encircling said filter for receiving and carrying away liquid discharged from said filter.

11. In an air cleaner for internal combustion engines the combination of a casing, a filtering medium therein, means for delivering oil for said filtering medium, a conduit for connection with an engine carburetor to induce a flow of air through said casing and filtering medium, and a separate conduit for direct connection with the engine intake manifold for energizing said oil delivery means.

12. In an air cleaner for internal combustion engines the combination of a casing having a liquid reservoir in the base thereof, a filtering medium in said casing above said reservoir, means including a hydraulic air lift for transferring liquid from said reservoir to said filtering medium, a conduit for connection with an engine carburetor for inducing a flow of air through said casing and filtering medium, and a separate conduit for direct connection with the engine intake manifold for energizing said hydraulic air lift.

13. In an air cleaner for internal combustion engines the combination of a casing forming an air passage, means within said casing for extracting dust from the air passing therethrough, a liquid reservoir, an upright tube, the lower end of said tube projecting into said reservoir, a restricted passage through which liquid is admitted from said reservoir to the base of said tube, means for admitting atmospheric air to the base of said tube, means for subjecting the upper end of said tube to a partial vacuum to thereby draw aerated liquid upwardly through said tube, and means for directing liquid supplied through said tube to said dust extracting means.

14. In an air cleaner for internal combustion engines the combination of a casing having a liquid reservoir therein, a filtering medium in said casing above said reservoir, a conduit for connection with an engine carburetor for inducing a flow of air through said casing and filtering medium, means supplied from said reservoir for delivering liquid into said flow of air, and a second conduit for direct connection with the engine intake manifold for energizing said last named means.

15. In an air cleaner for internal combustion engines the combination of a filter, means for connection with an engine carburetor for inducing a flow of air through said filter, and suction means for connection with the engine intake manifold independently of the carburetor for introducing liquid into said air flow.

16. In an air cleaner for internal combustion engines the combination of a filter, means for connection with an engine carburetor for inducing a flow of air through said filter, an oil reservoir, a chamber, a connection through which said chamber is exposed to suction within the intake manifold of the engine independently of the carburetor, means energized by the suction in said chamber for transferring liquid from said reservoir thereto, and means for transferring liquid from said chamber into said air flow.

ARTHUR W. MILLER.